United States Patent [19]

Smith

[11] Patent Number: 5,522,699
[45] Date of Patent: Jun. 4, 1996

[54] PIPE LAYING ASSEMBLY

[76] Inventor: William A. Smith, 421 Hilltop Rd., Adamsville, Ala.

[21] Appl. No.: 230,855

[22] Filed: Apr. 21, 1994

[51] Int. Cl.⁶ ..................................................... F16L 1/028
[52] U.S. Cl. .................. 405/154; 405/154; 414/245.4; 414/246.4
[58] Field of Search .................. 405/154, 174; 138/104, 105; 414/795.4, 795.5, 795.6, 796.4

[56] References Cited

U.S. PATENT DOCUMENTS

| | | | |
|---|---|---|---|
| 1,866,381 | 7/1932 | Ward . | |
| 2,538,365 | 1/1951 | Jones | 111/5 |
| 3,034,668 | 5/1962 | Wicks | 214/83.1 |
| 3,036,372 | 5/1962 | Vigneron | 29/237 |
| 3,561,615 | 2/1971 | Forsberg | 214/1 |
| 3,565,269 | 2/1971 | Martin | 405/177 X |
| 3,744,259 | 7/1973 | Wagley | 414/745.4 X |
| 3,858,731 | 1/1975 | Briggs | 414/745.5 X |
| 3,956,901 | 5/1976 | Brown | 405/154 |
| 4,362,435 | 12/1982 | Henry | 405/154 |
| 4,452,550 | 6/1984 | Hofmeester | 405/154 |
| 4,491,214 | 1/1985 | Malivoir et al. | 414/745.1 X |

FOREIGN PATENT DOCUMENTS 128128 7/1984 Japan ................ 414/745.9

*Primary Examiner*—Ramon S. Britts
*Assistant Examiner*—Frederick L. Lagman
*Attorney, Agent, or Firm*—Bill D. McCarthy; Phillip L. Free, Jr.

[57] ABSTRACT

A pipe laying apparatus for assembling segments of pipe into a pipeline, the pipe laying apparatus having a pipe storage assembly supported by a driving assembly. A pipe removing assembly removes individual pipe segments to a queuing area. A pipe orienting assembly orients the pipe axially, if required, and a supporting and aligning assembly lowers the oriented pipe segment to axial alignment with the pipeline being constructed, while a pipe coupling device installs the aligned pipe segment with the pipeline end. A sag control assembly provides support for the pipeline and lowers same to a desired location as the pipe laying assembly is driven along a selected pipeline construction route.

13 Claims, 5 Drawing Sheets

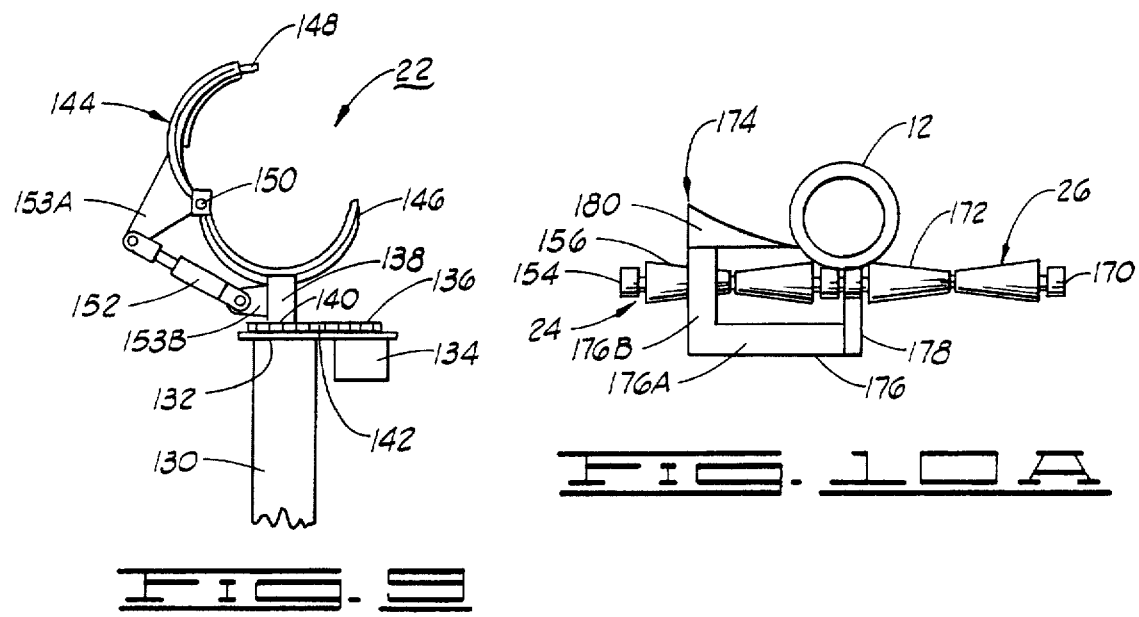
FIG. 9
FIG. 10A
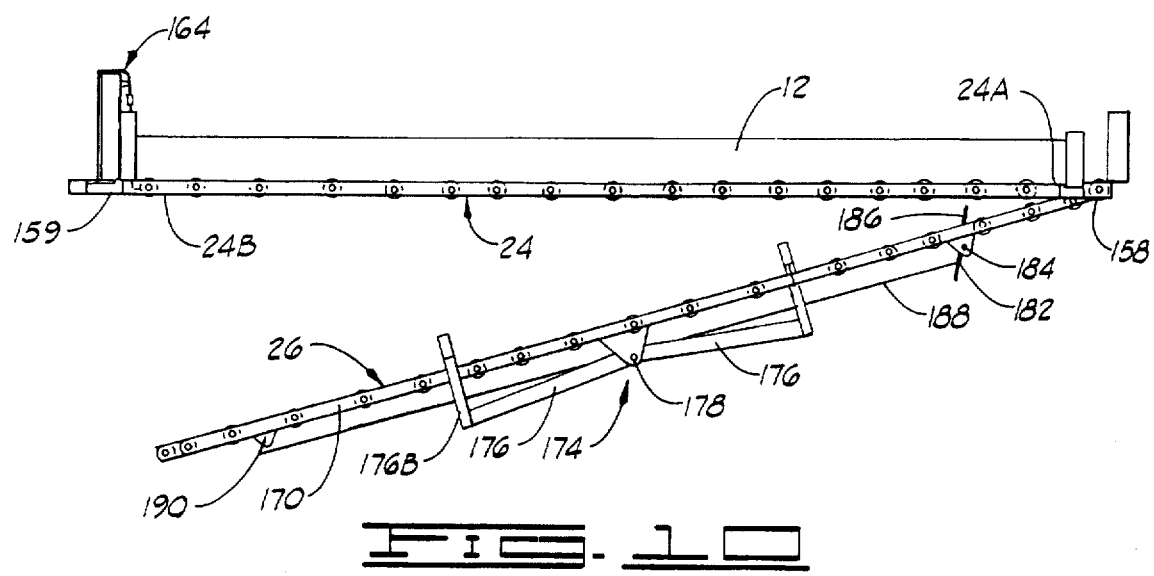
FIG. 10

PIPE LAYING ASSEMBLY

BACKGROUND OF THE INVENTION

1. Field of the Invention

The present invention relates to the field of pipeline construction, and more particularly but not by way of limitation, to an improved apparatus for the transport, and coupling of pipe segments during the pipeline construction process.

2. Discussion of the Prior Art

The ability to transport fluids across long distances has been foundational to man's societal advancement for centuries. Pipelines today provide a very basic element to the infrastructure in our densely populated cities, whereby fresh water and heating fluids are delivered to, and waste materials are efficiently taken from, our homes. Millions of acres of arid farmland have been transformed into amber fields of grain due to the development of irrigation systems delivering water by pipelines. Pipeline transport of fluids is often a better solution than over the road trucking, such as the TransAlaska pipeline which traverses hundreds of miles of rugged and often impassible terrain.

Today, pipelines are assembled from individual pipe segments that are typically fabricated of steel or plastic in variable lengths, and have diameters of less than an inch to several feet. The individual segments are commonly heavy and difficult to manipulate into the proper position for constructing the joints between them.

Further complications arise when the pipeline is to be buried. In the case of an underground pipeline, the segments must either be joined in the trench, or joined above ground and lowered down into the trench following joint construction. Manual transportation and manipulation of the segments are labor intensive undertakings.

Man's dependence on pipelines has inspired the development of numerous pipeline construction devices. Devices invented early in this century aided in the support and manipulation of a pipeline, allowing inspection, insulation, painting, or repair. An example of this type of device is taught by U.S. Pat. No. 1,866,381 issued to Ward. The typical pipeline at that time was of welded joint construction for steel pipe, or mechanical joint construction for cast iron pipe.

About the middle of this century came the development of the spigot and friction gasket type joint, which continues today to be a leading type of pipeline joint construction. This type of joint offers an easier coupling method, dramatically reducing the time necessary to assemble it. The resulting joint is also significantly more reliable, in that it produces a more flexible yet fluid tight seal. The resulting pipeline performs with increased resistance to normally occurring and damaging effects such as pressure or temperature shock, vibration, earth movement, and expansion or contraction.

The friction gasket type joint was first developed as a collar into which two pipe segment ends were seated. Several devices were invented to aid in the assembly of this type of joint. Typically the devices provided for above ground construction of the joints. Two pipe segments being coupled were gripped and forced axially into the friction gasket joint. The pipeline was then transported into the trench to be buried. An example of this type of device is taught by U.S. Pat. No. 2,538,365 issued to Jones.

An improvement to the spigot and friction gasket construction followed closely with the development of pipe segments formed with an integral "belled pipe". The smooth end of a first pipe segment is inserted into the bell end of a second segment. The advantage of this belled pipe is further reduced joint complexity, primarily because only one pipe end rather than two has to be seated into the bell, and also because fewer parts are necessary. Numerous devices have been invented to aid in the construction of this type of pipeline joint. Typically these devices provide for gripping the segment being added to the pipeline, and for applying the necessary axial force to drive the smooth end of the first pipe segment into the bell end of the second, or already laid pipe segment. Examples of this type of device are taught by U.S. Pat. No. 3,036,372 issued to Vigneron, and U.S. Pat. No. 3,561,615 issued to Forsberg.

While these and other inventions have improved the speed and quality of joint construction, the overall process of pipeline construction remains a cumbersome and often dangerous task. The pipe segments are typically shipped to the jobsite mounted on a skid, with the bell end alternating from one end to the other on adjacent pipes. This provides a more dense packing of the skid. Individual pipe segments must be transported from the skid to the joint construction location, which moves each time a segment is added to the pipeline. The construction rate is slowed when the pipe segments must be handled in a constrained environment, such as a wooded area, or an uneven or unstable terrain.

Regulations of the Occupational Safety and Health Administration (OSHA) which apply to the pipe laying industry require that the walls of a trench 4 feet deep or more be shored if anyone is required to enter the trench during the pipeline construction process. It is therefore advantageous to keep all workers out of the trench by constructing the joints above ground and then placing the pipeline into the trench.

An improvement in the art would be a device that is capable of storing an inventory of pipe segments, transporting them along the pipeline providing a continuous supply at the moving joint construction location, and drawing from the inventory as pipe segments are added to the pipeline. Further improvement would be realized by a device that would aid in the manipulation of the pipe segments from the storage area to the joint construction location, thus minimizing the physical handling of the segments by the operator. Such a self-contained device could make it possible for a single operator to construct pipelines at a faster rate than that done by an entire crew of operators manually.

SUMMARY OF THE INVENTION

The present invention provides an improved pipe laying assembly, a self-contained device that permits a single operator to join pipe segments without entering the trench in an underground pipeline installation. The pipe laying assembly has a storage rack that holds a plurality of pipe segments while transporting such pipe segments along the pipeline construction path. From the storage rack it queues individual pipe segments for delivery to a suitable location to construct the pipeline. During queuing, the device determines the current orientation of each pipe segment delivered from the storage rack and axially orients the pipe segment as necessary before delivering it, thereby permitting alternate rack storage alignment in the manner normally skid mounted from the pipe manufacturer.

After queuing, the pipe segment is delivered to a conveyor, and restrained in a position to facilitate the operator's preparation of the smooth end, namely for cleaning and lubricating. Once prepared, the pipe segment is released and caused to be joint inserted and seated by a ram, the smooth end of the pipe segment being disposed in the bell end of the previously laid pipe segment.

An objective of the present invention is to provide a pipe laying assembly that is capable of holding an inventory of pipe segments in an alternate axial orientation and which is capable of properly orienting and assembling such segments into a continuous pipeline.

Yet another objective of the present invention, while achieving the above stated object, is to provide a pipe laying assembly capable of continuously orienting, assembling and laying pipe segments into a trench to form a pipeline.

One further objective of the present invention, while achieving the above stated objectives, is to provide a self-contained pipe laying assembly that can be operated by a single operator.

Still one other objective of the present invention, while achieving the above stated objectives, is to provide a pipe laying assembly that is safe and inexpensive to operate and that effects relatively rapid pipeline construction.

Other objects, features, and advantages of the present invention will become apparent from the following description when read in conjunction with the drawings and appended claims.

BRIEF DESCRIPTION OF THE DRAWINGS

FIG. 9 is a side elevational view of the pipe turning mechanism of the pipe laying assembly.

FIG. 10 is an elevational view of the pipe elevator and the pipe conveyor, the pipe elevator shown at its upper limit of travel; FIG. 10A is a diagrammatical, end elevational view of the pipe transfer mechanism showing the pipe elevator at its lower limit of travel.

DESCRIPTION

Figure 1:
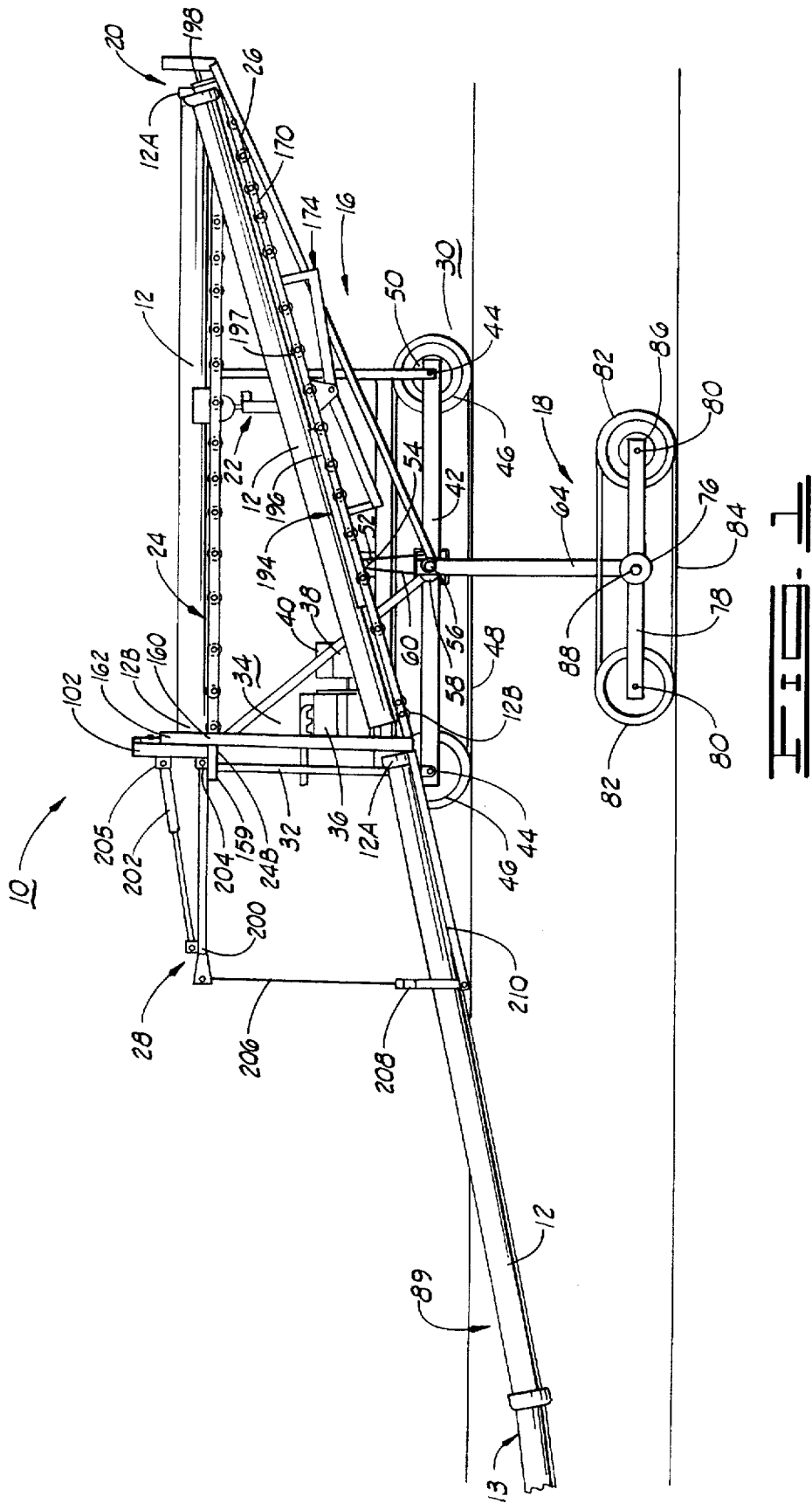
FIG. 1 is a side elevational view of a pipe laying assembly constructed in accordance with the present invention.

Referring to the drawings in general, and to FIG. 1 specifically, shown therein is a pipe laying assembly 10 which is constructed in accordance with the present invention. In this view the pipe laying assembly 10 is shown as used to interconnect pipe segments 12 so as to construct a pipeline 13 and deliver such pipeline to a desired location such as in a trench. The pipe laying assembly 10 as shown is constructed of several component assemblies, generally denoted as a drive mechanism 16, an outrigger mechanism 18, a pipe storage rack 20, a pipe turning mechanism 22, a pipe elevator 24, a pipe conveyor 26, and a sag control mechanism 28.

The drive mechanism 16 and the outrigger mechanism 18 cooperate to form a vehicle 30 for the support and transport of the other pipe laying component assemblies. The drive mechanism 16 has a frame 32 constructed of structural steel members in a conventional manner forming a rigid chassis framework. The frame 32 provides structural support for a power plant 34 made up of an engine 36 driving a hydraulic pump 38. A reservoir 40 provides a supply of fluid for the power plant 34. All hydraulic components to be described hereinafter are powered by the power plant 34.

The frame 32 includes a horizontal member 42, which has bearings 44 disposed therein, and which support axle mounted wheels 46. An endless belt 48 is attached around the wheels 46 for improved traction capability. The wheels 46 are powered by a hydraulic motor 50.

Figure 2:
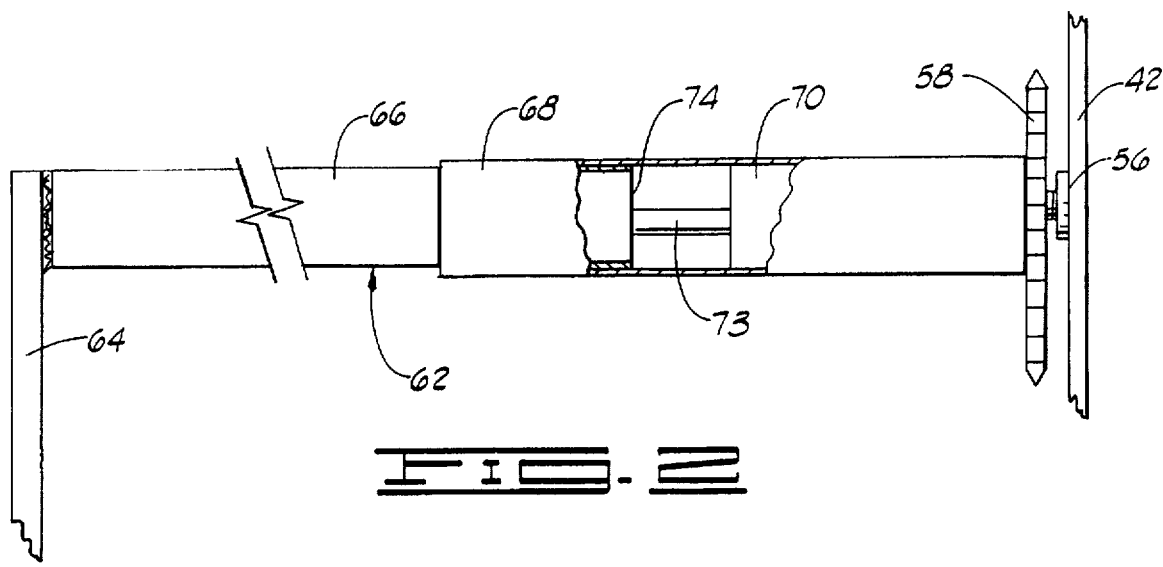
FIG. 2 is a partially cut away, partially detailed view of the outrigger shaft assembly of the pipe laying assembly.

The frame 32 has a rotary actuator 52 attached thereon, with a gear 54 attached to its output shaft. The horizontal member 42 furthermore has a bearing 56 disposed therein, which supports a sprocket 58. The gear 54 is in communication with the sprocket 58 by way of a chain 60. FIG. 2 shows an outrigger shaft assembly 62 attached to the sprocket 58. An outrigger cam 64 is rigidly attached to, in a manner essentially perpendicular to, the distal end of the outrigger shaft assembly 62.

The outrigger shaft assembly 62 is shown constructed to include an expansion joint, by way of a first square tube member 66, sized accordingly to fit slidingly within a second square tube member 68. A hydraulic cylinder 70 is disposed within the second square tube member 68, and is rigidly attached thereto. The cylinder 70 has an extendible rod 73 which is rigidly attached to an end plate 74 disposed within and attached to the first square tube member 66. The outrigger cam 64 is rigidly attached to the distal end of the first square tube member 66.

Returning to FIG. 1, the outrigger mechanism 18 is shown having a frame 76 constructed of structural steel members in a conventional manner, forming a rigid chassis framework. The frame 76 includes a horizontal member 78, which has bearings 80 disposed therein, which support axle mounted wheels 82. An endless belt 84 is attached around the wheels 82, for improved traction capability. The wheels 82 are powered by a hydraulic motor 86.

Figure 3:
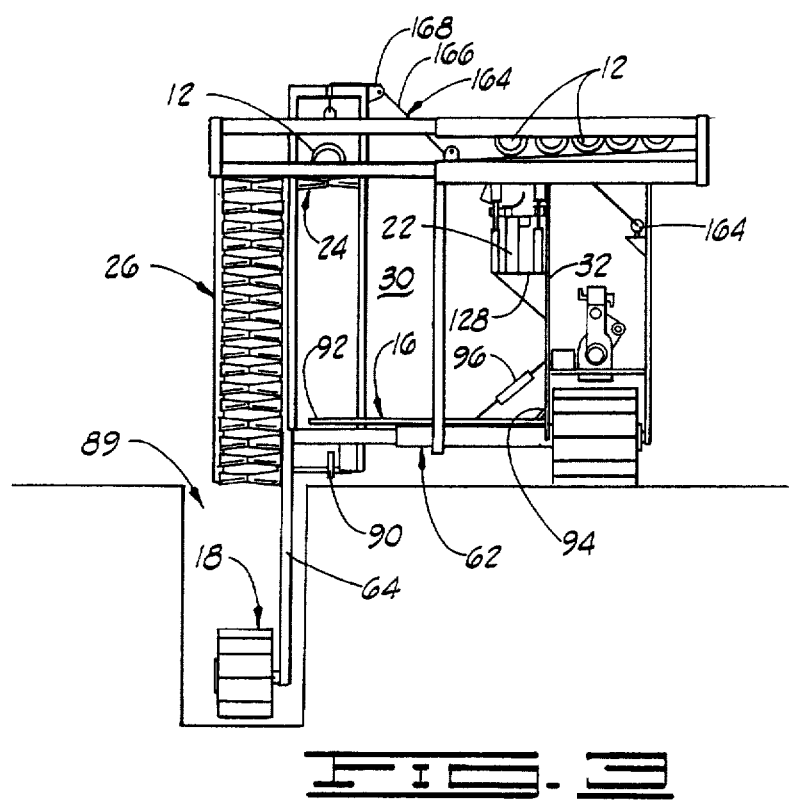
FIG. 3 is an elevational view of the front end of the pipe laying assembly.
Figure 4:
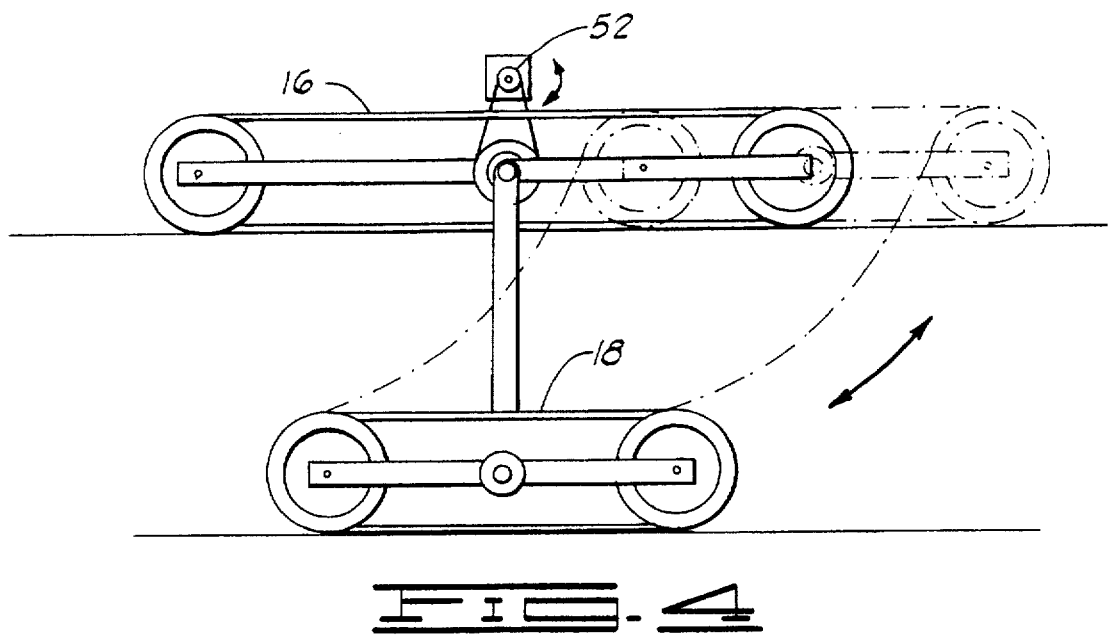
FIG. 4 is a partially detailed, diagrammatical view in elevation of the outrigger drive mechanism of the pipeline assembly showing the range of positions possible.

The horizontal member 78 has furthermore disposed therein a bearing 88. The distal end of the outrigger cam 64 is rotatably disposed within the bearing 88. FIG. 3 illustrates the connection, via the outrigger shaft assembly 62 and the outrigger cam 64, of the drive mechanism 16, which drives along the bank at ground level, and the outrigger mechanism 18, which drives along the bottom of a trench 89. FIG. 4 illustrates how rotational displacement of the actuator 52 results in elevational displacement of the outrigger mechanism 18 with respect to the drive mechanism 16.

The change in elevation of the outrigger mechanism 18 relative to the drive mechanism 16 allows the vehicle 30 to compensate for elevational differences between the surfaces upon which they roll. These differences may result from variations in the bank elevation and in the trench depth, or may be due to foreign obstacles in the path of the pipe laying assembly 10. FIG. 3 shows an idler wheel 90 positioned on the outrigger shaft assembly 62 and located so that the idler wheel 90 clears the bank when the vehicle 30 is transporting normally. In case of a sudden trench or bank elevation drop, the idler wheel 90 contacts the bank and stabilizes the vehicle 30.

As described, the pipe laying assembly 10 propels on the drive mechanism 16 and the outrigger mechanism 18. Velocity is determined by the operator's setting of flow controls governing the motor 50 and the motor 86. Direction of the vehicle 30 can be reversed by fluid control to reverse the direction of the motors 50, 86. Steering the pipe laying assembly 10 is accomplished by altering the flow to motor 50 in the drive mechanism 16, with respect to the flow to motor 86 in the outrigger mechanism 18. For instance, to turn right the operator increases the flow to motor 50 and either holds constant or decreases flow to motor 86, or decreases the flow to motor 86 and either holds constant or increases the flow to motor 50.

Referring now to the drive mechanism 16, the frame 32 supports a platform 92. The platform 92 rotates from a vertical to a horizontal position about a hinge 94, and is raised and lowered by way of a hydraulic cylinder 96. The ability to raise the platform 92 facilitates vehicle 30 transit and storage. Lowered, the platform 92 provides a working area for the operator, providing access to all hydraulic controls and to the joint construction location.

Figure 5:
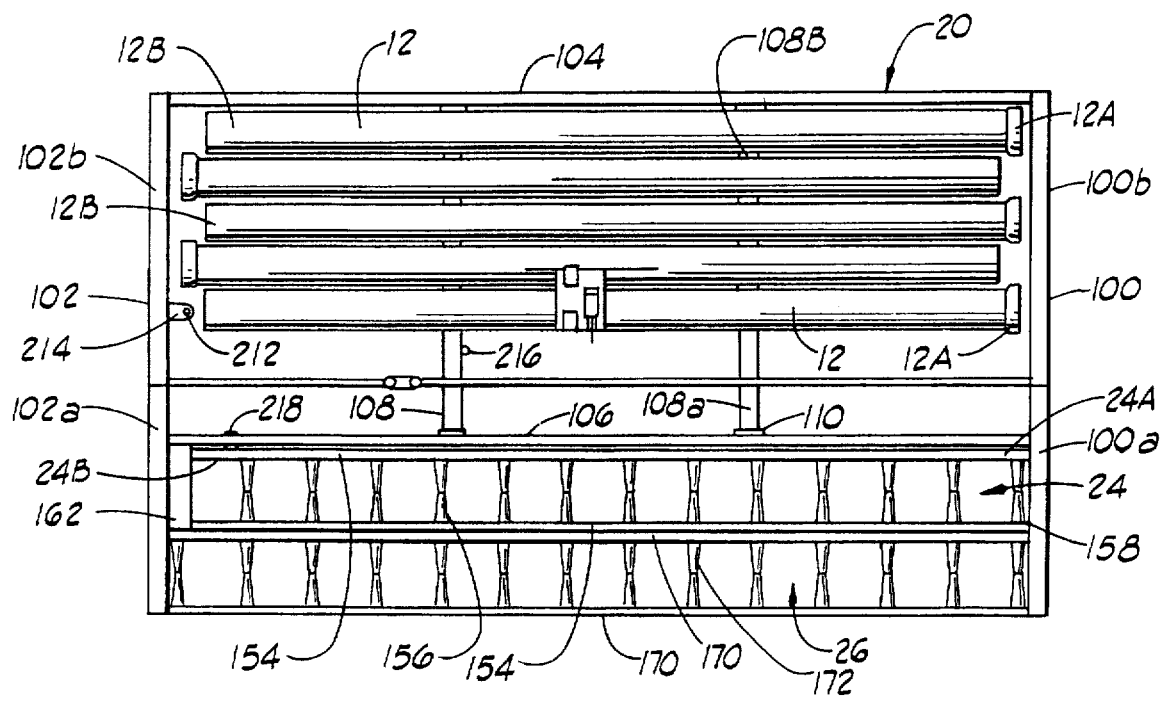
FIG. 5 is a top plan view of the pipe support rack of the pipe laying assembly.

Referring now to FIG. 5, attached to the top of the drive mechanism 16, and structurally supported by the frame 32 is the pipe storage rack 20. The pipe storage rack 20 is constructed of structural steel components in a conventional manner to form a framework for the storage of the plurality of pipe segments 12. The pipe storage rack 20 has perimeteral framework members including a front end assembly 100, a rear end assembly 102, a side assembly 104, and a side assembly 106. A framework bottom is made of a plurality of pipe supports 108, which are attached by a hinge 110 at both ends to the side assembly 104 and the side assembly 106. The pipe supports 108 are inclined in a direction downward from the side assembly 104 to the side assembly 106.

The front end assembly 100 is constructed of substantially vertically parallel rails of square tubing pairs, which form an expansion joint resulting from the tubes being sized accordingly such that tube member 100A slides within tube member 100B. In like manner, the rear end assembly 102 is constructed of substantially vertically parallel rails of square tubing pairs, which form an expansion joint resulting from the tubes being sized accordingly such that tube member 102A slides within tube member 102B. Further, the pipe supports 108 are constructed of square tubing pairs which form an expansion joint resulting from the tubes being sized accordingly such that tube member 108A slides within tube member 108B.

Figure 6:
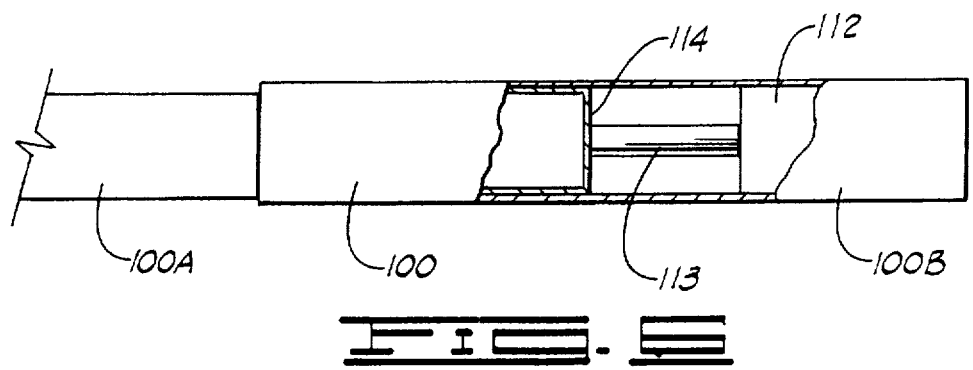
FIG. 6 is a partially cut away, partially detailed view of the front end assembly of the pipe laying assembly.

FIG. 6 shows a hydraulic cylinder 112 disposed within one of the parallel rails of the front end assembly 100. The cylinder 112 is rigidly attached to the tube member 100B, and the cylinder 112 has an extendible rod 113 which is rigidly attached to an end plate 114 disposed within the tube member 100A. Thus, extension and retraction of the cylinder 112, via the selective application of pressurized fluid, effects linear displacement of the tube member 100A, which is slidingly constrained by the tube member 100B.

Figure 7:
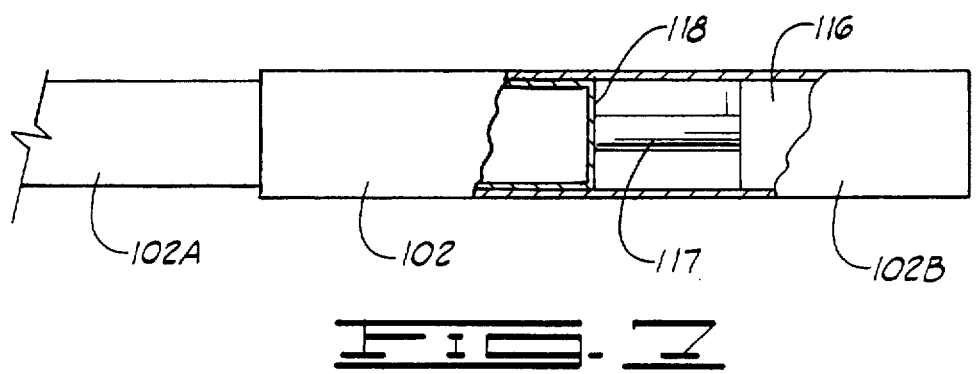
FIG. 7 is a partially cut away, partially detailed view of the front end assembly of the pipe laying assembly.

FIG. 7 shows a hydraulic cylinder 116 disposed within one of the parallel rails of the rear end assembly 102. The cylinder 116 is rigidly attached to the tube member 102B, and the cylinder 116 has an extendible rod 117 which is rigidly attached to an end plate 118 disposed within the tube member 102A. Thus, extension and retraction of the cylinder 116 effects linear displacement of the tube member 102A, which is slidingly constrained by the tube member 102B.

Figure 8:
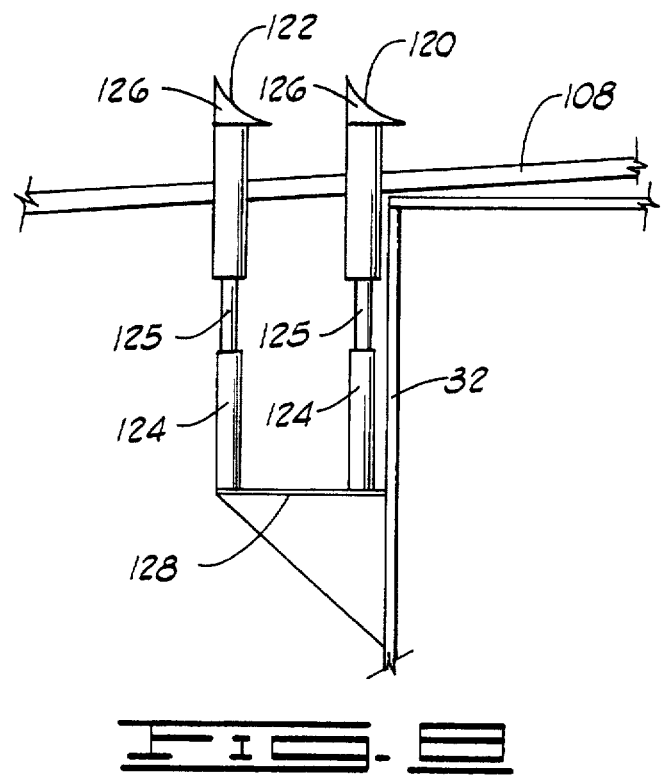
FIG. 8 is a partially detailed, side elevational view of the pipe stops of the pipe laying assembly.

Turning now to FIG. 8, a first pipe stop 120 and a second pipe stop 122 are shown. Each of the pipe stops 120, 122 has a cylinder 124 which has an extendible rod 125. An arcuate member 126 is attached to the distal end of the cylinder rod 125. The cylinder 124 is mounted vertically upon a shelf 128 depending from the frame 32.

The first pipe stop 120, when extended, holds back the plurality of pipe segments 12 in the pipe storage rack 20. If the first pipe stop 120 is retracted, the pipe segments 12 will roll down the inclined pipe supports 108. If the second pipe stop 122 is extended when the first pipe stop 120 is retracted, then the pipe segments 12 will roll downward until the leading one is pressingly engaged against the second pipe stop 122. In this manner, the second pipe stop 122 is holding back all pipe segments 12 in the pipe storage rack 20, as the first pipe stop 120 did in the previous manner. If now, the first pipe stop 120 is extended while the second pipe stop 122 remains extended, the first pipe stop 120 will impinge between the leading pipe segment 12 which is against the second pipe stop 122, and the adjacent second most leading pipe segment 12. The first pipe stop 120 in this manner is now holding back all pipe segments 12 in the pipe storage rack 20 except one, the pipe segment 12 between the first pipe stop 120 and the second pipe stop 122. This individual pipe segment 12 is referred to as being in a queued state, being in a queue 121 between the extended first pipe stop 120 and the extended second pipe stop 122.

The pipe segments 12 in the pipe storage rack 20 are usually oriented such that some have a bell end 12A near the front end assembly 100 of the pipe storage rack 20 with a smooth end 12B disposed near the rear end assembly 102. Alternatively, some of the pipe segments 12 will have the bell end 12A near the rear end assembly 102 and the spigot or smooth end 12B near the front end assembly 100. Usually the orientation of the bell end 12A will alternate on adjacent pipe segments 12. Regardless of the orientation in the pipe storage rack 20, each pipe segment 12 is preferably oriented with the bell end 12A nearer the front end assembly 100 when it is released from the queue 121. It is necessary, therefore, to turn some of the pipe segments 12 around.

FIG. 3 shows the pipe turning mechanism 22 attached to the shelf 128 extending from the frame 32. As shown in FIG. 9, the pipe turning mechanism 22 has a vertically mounted hydraulic cylinder 130 supported on the shelf 128. The cylinder 130 has an extendible rod (not shown), and a base plate 132 is attached to the distal end of the cylinder rod. A motor 134 is supported on the base plate 132, and attached to the output shaft of the motor 134 is a sprocket 136. A bearing (not shown) attached to the base plate 132 rotatably supports a shaft 138 to which is attached a sprocket 140 in planar alignment with the sprocket 136. The motor 134 communicates rotational motion to the shaft 138 by way of a chain 142 connected around both sprockets 136, 140.

Attached to the distal end of the shaft 138 is a clamp assembly 144. The clamp assembly 144 is made of two arcuate sections, a bottom segment 146 and an upper segment 148, joined by a hinge 150. The bottom segment 146 is upwardly curved, essentially semi-circular, and is rigidly attached to the shaft 138. The upper segment 148 is rotatable about the hinge 150 by a cylinder 152 which is attached between the upper segment 148 (via a tab 153A) and the shaft 138 (via a tab 153B). When the cylinder 152 is extended, the clamp assembly 144 closes and clamps the pipe segment 12. When the cylinder 152 is retracted, the clamp assembly 144 opens. In this open position, the upper segment 148 clears sufficiently such that upward displacement of the cylinder 130 brings the bottom segment 146 into pressing engagement with the pipe segment 12 in the queue 121 above.

Returning to a consideration of FIG. 5, a pipe released from the queue 121 rolls down the pipe supports 108, the lower ends of which are attached to the side assembly 106. Directly beyond the end of the pipe supports 108 is the pipe elevator 24. The pipe elevator 24, having a first end 24A and a second end 24B, is constructed as a gravity type roller conveyor with a pair of spaced apart side rails 154 which support a plurality of rollers 156. The first end 24A of the pipe elevator 24 is attached with a hinge 158 to the front end assembly 100. As shown in FIG. 1, the second end 24B of the pipe elevator 24 has slots 159 in the parallel side rails 154 to receive a pin 160. The pin 160 passes through both side rails 154, and the ends of the pin 160 are disposed and maintained for vertical movement only by a guide frame 162. As shown in FIG. 3, the second end 24B of the pipe elevator 24 is raised and lowered by a winch 164 having a cable 166 and pulleys 168. In this manner the pipe elevator 24 is rotatable from an essentially horizontal position at the top limit of travel of the pipe elevator 24, to a position sloping downwardly from the front end assembly 100 at the lower limit of travel of the pipe elevator 24.

Shown further in FIG. 5 is the pipe conveyor 26. The pipe conveyor 26 is constructed as an inclined gravity type roller conveyor with a pair of spaced apart, parallel rails 170 which support a plurality of rollers 172. The pipe conveyor 26 is rigidly attached between the front end assembly 100 and the guide frame 162 of the pipe elevator 24. The pipe conveyor 26 is angularly disposed so as to be juxtaposed and parallel to the pipe elevator 24 when the second end 24B of the pipe elevator 24 is at the lower limit of travel thereof.

FIG. 10 shows a pipe transfer assembly 174 attached to the rail 170 of the pipe conveyor 26. The pipe transfer assembly 174 includes a pair of levelling arm members 176 which are centrally disposed and pivot about a pin 178. As shown more clearly in FIG. 10A, the distal end of each of the levelling arm members 176 has a portion 176A which extends horizontally outward, and each levelling arm member 176 has a portion 176B which extends vertically upward, each such portion 176B supporting an attached arcuate member 180. Each of the arcuate members 180 extends upward through the pipe elevator 24 as the pipe elevator 24 nears the lower limit of travel, the arcuate members 180 disposed in the gaps formed between the rollers 156 and the side rails 154 of the pipe conveyor 24. FIG. 10A further shows how the pipe transfer assembly 174 moves the pipe segment 12 from the pipe elevator 24 to the pipe conveyor 26 as the second end 24B of the pipe elevator 24 approaches the lower limit of travel thereof.

As shown in FIG. 10, a cam 182 is supported by the rail 170, rotatably disposed about a pin 184. A fork member 186 is rigidly attached to the cam 182 and oriented such that the fork member 186 extends between the rails 170 and above the rollers 172. Also attached to the cam 182 is a linkage 188 extending downward to a location accessible to an operator on the platform 92. Attached to the distal end of the linkage 188 is a cam 190 operable by a handle (not shown), used by the operator to rotate the cam 190, which by way of linkage 188 transfers rotary motion to the cam 182, effecting retraction and extension of the fork member 186.

Returning to FIG. 1, further shown is a hydraulic ram assembly 194 attached to the pipe conveyor rail 170. The ram assembly 194 includes a cylinder 196 and an extendible rod 197; the cylinder 196 is mounted so that the rod 197 is parallel to the pipe conveyor 26. Attached to the distal end of the rod 197 is a hook member 198. The length of the rod 197 and the cylinder stroke of the cylinder 196 is such that in the extended position the hook member 198 does not impede the motion of the pipe segment 12 being moved from the pipe elevator 24 to the pipe conveyor 26. When the cylinder 196 is pressure actuated to operably retract the rod 197, the hook member 198 engages the bell end 12A of the pipe segment 12 and pulls the pipe segment 12 axially with a force sufficient to seat the smooth end 12B of the pipe segment 12 into the bell end 12A of the previously laid pipe segment 12.

The sag control mechanism 28, as shown in FIG. 1, is constructed of structural steel components in a conventional manner to have a horizontal member 200 and an extendible cylinder 202 which are rotatably attached with pins 204 and 205, respectively, to apertured members extending from the rear end assembly 102. A cable 206, depending from the distal end of the horizontal member 200, supports a housing or collar 208. The housing 208 has a roller (not shown) disposed therein, on which the end of the pipeline 13 is supported as pipe segments 12 are installed. A stabilizer 210 is pinned for vertical rotation only to the lower end of the conveyor rails 170 of the pipe conveyor 26, and to the housing 208. The cylinder 202 provides vertical displacement of the horizontal member 200 for tensioning the pipeline 13, ensuring a square face plane fit up of the bell end 12A of the pipeline 13 to the smooth end 12B of the pipe segment 12 being joined thereto.

Returning now to FIG. 5, a photoelectric sensor 212 is shown mounted to the rear end assembly 102 by a bracket 214 extending therefrom. The photoelectric sensor 212 is a conventional sensor having a target mirror (not shown) for the generation of a light beam barrier. The photoelectric sensor 212 is positioned above and below the queue 121 and is located so as to have its light beam interrupted when a pipe segment 12 is present. As shown, the pipe segments 12 are staggered, having the bell ends 12A extending beyond adjacent smooth ends 12B. The photoelectric sensor 212 is located to sense when the pipe bell end 12A is present for the pipe segment 12 which is in the queue 121, thus being capable of differentiating between the bell end 12A and the smooth end 12B so as to signal the orientation of the pipe segment 12 in the queue 121.

A first limit switch 216 is attached to the pipe support 108, being positioned such that a pipe segment 12 released from the queue 121 will make switch contact as the pipe segment 12 rolls by. A second limit switch 218 is attached to the side assembly 106 in a manner so as to make switch contact when the pipe elevator 24 is located at the upper limit of travel.

To prepare a pipe segment 12 for delivery to the joint construction location, the second pipe stop 122 is extended while the first pipe stop 120 is retracted. This allows the pipe segments 12 in the pipe storage rack 20 to roll down the inclined pipe supports 108. The second pipe stop 122 prevents the pipe segments 12 from rolling beyond the second pipe stop 122. At this point the first pipe stop 120 is extended, thus capturing a single pipe segment 12 in the queue 121. The photoelectric sensor 212 senses whether the bell end 12A is nearest the rear end assembly 102. If so, the photoelectric sensor 212 signals the pipe turning mechanism 22 to clamp the pipe segment 12, raise the pipe segment 12 above the others, and rotate the pipe segment 12 180 degrees. Next, the pipe turning mechanism 22 lowers the turned pipe segment 12 back down into the queue 121, and releases the pipe segment 12. The single pipe segment 12 is now properly oriented for delivery to the joint construction location with the proper bell end 12A orientation.

When the operator is ready for the next pipe segment 12, the operator retracts the second pipe stop 122. The second pipe stop 122, however, is interlocked with the second limit switch 218, and thus will not retract until the pipe elevator 24 is positioned at the upper limit of travel thereof. Upon retraction of the second pipe stop 122, the pipe segment 12 rolls down the pipe support 108. The second pipe stop 122 is also interlocked with the first limit switch 216 so that when the pipe segment 12 rolls past this switch, the second pipe stop 122 will be extended.

At this point, the operator retracts the first pipe stop 120, and extends the first pipe stop 120 again after the pipe segments 12 in the pipe storage rack 20 have rolled down against the second pipe stop 122. The operator has now captured a single pipe segment 12 in the queue 121. The pipe turning mechanism 22 will determine whether the pipe segment 12 in the queue 121 needs to be rotated, and will rotate the pipe segment 12 if necessary. The second pipe stop 122 is further interlocked with the pipe turning mechanism 22 so that retraction of the second pipe stop 122 will not occur unless the pipe turning mechanism 22 is retracted.

Returning now to the pipe segment 12 released from the queue 121 and rolling down the pipe support 108, the pipe segment 12 rolls down and onto the pipe elevator 24. The operator lowers the pipe elevator 24, which eventually becomes engaged with the pipe transfer assembly 174, and which causes the pipe segment 12 to move from the pipe elevator 24 to the pipe conveyor 26. At this point, the operator returns the pipe elevator 24 to the upper position thereof.

The pipe segment 12 will roll down the pipe conveyor 26 until the bell end 12A thereof becomes pressingly engaged against the fork member 186. Suspended on the pipe conveyor 26 in this manner, the operator is able to prepare the smooth end 12B of the pipe, namely to inspect, clean and lubricate the smooth end 12B. When ready, the operator retracts the fork member 186, allowing the pipe segment 12 to roll down the pipe conveyor 26 to become pressingly engaged within the bell end 12A of the last assembled pipe segment 12 of the pipeline 13. The end of the pipeline 13 is held in support and alignment by the sag control mechanism 28 during installment of the pipe segment 12.

The operator verifies proper alignment of the smooth end 12B face to the bell end 12A face. When verified, the operator activates the ram assembly 194 which forces the smooth end 12B of the pipe segment 12 into the bell end 12A of the pipeline 13, thus constructing a pipe joint. At this point, the operator is ready to repeat the cycle, beginning with return extension of the ram assembly 194 and the release of another pipe segment 12 from the queue 121. All the while, the pipe laying assembly 10 is propelling forward at a speed sufficient to support a smooth and continuous process of releasing, manipulating, and coupling pipe segments 12.

It will be appreciated that many details of construction of the pipe laying assembly 10 have been omitted as such will be known by persons of ordinary skill in the art, such as piping, valving and control mechanisms for the several hydraulic cylinders and motors, and other conventional details.

It will be clear that the present invention is well adapted to carry out the objects and to attain the advantages mentioned, as well as those inherent therein. While presently preferred embodiments of the invention have been described for the purposes of this disclosure, numerous changes can be made which will readily suggest themselves to those skilled in the art and which are encompassed within the spirit of the invention disclosed and as defined in the appended claims.

What is claimed is:

1. An apparatus for laying and assembling segments of pipe to form a pipeline, the pipe segments being asymmetrical and having a makeup end and an insert end, the apparatus comprising:

pipe storage means for storing a plurality of segments of pipe, the pipe storage means comprising a pipe delivery means for biasing the pipe segments toward a queuing position;

pipe removal means for removing each individual pipe segment from the pipe storage means, the pipe removal means comprising:
an inclined pipe support ramp; and
restraining means for selectively restraining the pipe segments and for permitting a single pipe segment in the queuing position to slide onto the inclined pipe support ramp;

means for supporting and aligning the pipe segment coextensive to the pipeline, comprising:
pipe elevator means receiving a pipe segment from the inclined pipe ramp for lowering and aligning the queued pipe segment in longitudinal alignment with the longitudinal axis of the pipeline;

means for coupling the aligned pipe segment to the end segment of the pipeline;

means for orienting the individual pipe segment so that the insert end of such pipe segment is oriented in a predetermined position;

driving means for driving the apparatus along a selected path as the length of the pipeline increases;

sag control means for supporting an end of the pipeline and for lowering the pipeline to a desired position as the driving means drives the apparatus along the selected path; and wherein the pipe storage means comprises a frame supported by the driving means; and wherein the pipe elevator means comprises:
an inclined conveyor disposed in substantial alignment with the pipeline;
a pipe elevator pivotally supported by the frame and pivotable between an upper position and a lower position, the lower position being substantially adjacent the inclined conveyor;
pipe transfer means for effecting transfer of the pipe segment from the pipe elevator to the inclined conveyor when the pipe elevator is moved to the lower position; and
means for selectively moving the pipe elevator between its upper and lower positions.

2. The apparatus of claim 1 wherein the coupling means comprises:
means for moving the aligned pipe segment in the longitudinal axial direction so that the pipe segment is forced into seating engagement with the supported pipeline end.

3. The apparatus of claim 2 wherein the driving means comprises:
a drive mechanism;
an outrigger mechanism; and
means for articulating the outrigger mechanism relative to the drive mechanism to maintain the apparatus in substantially level orientation as the apparatus drives along the selected path.

4. An apparatus for laying and assembling segments of pipe to form a pipeline, comprising:

pipe storage means for storing a plurality of segments of pipe, and comprising a pipe delivery means for biasing the pipe segments toward a queuing position;

pipe removal means for removing each individual pipe segment from the pipe storage means, the pipe removal means comprising:
 an inclined pipe support ramp; and
 restraining means for selectively restraining the pipe segments and for permitting a single pipe segment in the queuing position to slide onto the inclined pipe support ramp;

means for supporting and aligning the pipe segment coextensive to the pipeline and comprising:
 pipe elevator means receiving a pipe segment from the inclined pipe ram for lowering and aligning the queued pipe segment in longitudinal alignment with the longitudinal axis of the pipeline; and means for coupling the aligned pipe segment to the end segment of the pipeline;

driving means for driving the apparatus along a selected path as the length of the pipeline increases; and sag control means for supporting an end of the pipeline and for lowering the pipeline to a desired position as the driving means drives the apparatus along the selected path;

wherein the pipe storage means comprises a frame supported by the driving means; and wherein the pipe elevator means comprises:
 an inclined conveyor disposed in substantial alignment with the pipeline;
 a pipe elevator pivotally supported by the frame and pivotable between an upper position and a lower position, the lower position being substantially adjacent the inclined conveyor;
 pipe transfer means for effecting transfer of the pipe segment from the pipe elevator to the inclined conveyor when the pipe elevator is moved to the lower position; and
 means for selectively moving the pipe elevator between its upper and lower positions.

5. The apparatus of claim 4 wherein the coupling means comprises:
 means for moving the aligned pipe segment in the longitudinal axial direction so that the pipe segment is forced into seating engagement with the supported pipeline end.

6. The apparatus of claim 5 wherein the driving means comprises:
 a drive mechanism;
 an outrigger mechanism; and
 means for articulating the outrigger mechanism relative to the drive mechanism to maintain the apparatus in substantially level orientation as the apparatus drives along the selected path.

7. An apparatus for laying and assembling segments of pipe to form a pipeline, comprising:
 pipe storage means for storing a plurality of segments of pipe, the pipe storage means comprising a pipe delivery means for biasing the pipe segments toward a queuing position;
 pipe removal means for removing each individual pipe segment from the pipe storage means, the pipe removal means comprising:
  an inclined pipe support ramp; and
  restraining means for selectively restraining the pipe segments and for permitting a single pipe segment in the queuing position to slide onto the inclined pipe support ramp;
 means for supporting and aligning the pipe segment coextensive to the pipeline, the supporting and aligning means comprising:
  pipe elevator means receiving a pipe segment from the inclined pipe ramp for lowering and aligning the queued pipe segment in longitudinal alignment with the longitudinal axis of the pipeline;
 means for coupling the aligned pipe segment to the end segment of the pipeline;
 sag control means for supporting an end of the pipeline and for lowering the pipeline to a desired position as the driving means drives the apparatus along the selected path:
 wherein the storage means comprises a frame supported by the driving means; and
 wherein the pipe elevator means comprises:
  an inclined conveyor disposed in substantial alignment with the pipeline;
  a pipe elevator pivotally supported by the frame and pivotable between an upper position and a lower position, the lower position being substantially adjacent the inclined conveyor;
  pipe transfer means for effecting transfer of the pipe segment from the pipe elevator to the inclined conveyor when the pipe elevator is moved to the lower position; and
  means for selectively moving the pipe elevator between its upper and lower positions.

8. The apparatus of claim 7 wherein the coupling means comprises:
 means for moving the aligned pipe segment in the longitudinal axial direction so that the pipe segment is forced into seating engagement with the supported pipeline end.

9. An apparatus for laying and assembling segments of pipe of the type having a bell end and a smooth end, the assembled pipe segments forming a pipeline, the apparatus comprising:
 a frame;
 means for driving the frame;
 pipe storage means, supported by the frame, for storing a plurality of segments of pipe;
 means for removing an individual pipe segment from the pipe storage means;
 means for orienting the individual pipe segment after removal from the pipe storage means such that the bell end of the individual pipe segment is oriented in a predetermined direction;
 means for supporting and aligning the oriented pipe segment such that the longitudinal axis of the oriented pipe segment is coextensive with the pipeline;
 means for coupling the aligned pipe segment to the end segment of the pipeline whereby the smooth end of one of the two pipe segments is seated in the bell end of the other segment;
 means for supporting and lowering the pipeline so that the pipeline is supported and lowered to a desired location as the driving means drives the apparatus;
 wherein the pipe storage means comprises a frame supported by the driving means; and
 wherein the pipe elevator means comprises:
  an inclined conveyor disposed in substantial alignment with the pipeline;

a pipe elevator pivotally supported by the frame and pivotable between an upper position and a lower position, the lower position being substantially adjacent the inclined conveyor;

pipe transfer means for effecting transfer of the pipe segment from the pipe elevator to the inclined conveyor when the pipe elevator is moved to the lower position; and means for selectively moving the pipe elevator between its upper and lower positions.

10. The apparatus of claim 9 wherein the supporting and aligning means comprises:

pipe elevator means receiving a pipe segment from the inclined pipe ramp for lowering and aligning the queued pipe segment in longitudinal alignment with the longitudinal axis of the pipeline.

11. The apparatus of claim 10 wherein the pipe storage means comprises a frame supported by the driving means and wherein the pipe elevator means comprises:

an inclined conveyor disposed in substantial alignment with the pipeline;

a pipe elevator pivotally supported by the frame and pivotable between an upper position and a lower position, the lower position being substantially adjacent the inclined conveyor;

pipe transfer means for effecting transfer of the pipe segment from the pipe elevator to the inclined conveyor when the pipe elevator is moved to the lower position; and means for selectively moving the pipe elevator between its upper and lower positions.

12. The apparatus of claim 11 wherein the coupling means comprises:

means for moving the aligned pipe segment in the longitudinal axial direction so that the pipe segment is forced into seating engagement with the supported pipeline end.

13. The apparatus of claim 12 wherein the driving means comprises:

a drive mechanism;

an outrigger mechanism; and means for articulating the outrigger mechanism relative to the drive mechanism to maintain the apparatus in substantially level orientation as the apparatus drives along the selected path.

\* \* \* \* \*

UNITED STATES PATENT AND TRADEMARK OFFICE
CERTIFICATE OF CORRECTION

PATENT NO. : 5,522,699
DATED : June 4, 1996
INVENTOR(S) : William A. Smith

It is certified that error appears in the above-indentified patent and that said Letters Patent is hereby corrected as shown below:

Column 11, line 15, delete "ram" and substitute therefor --ramp--; and

Column 11, line 67, delete "pipe'" and substitute therefor --pipe--.

Signed and Sealed this

Tenth Day of December, 1996

*Attest:*

BRUCE LEHMAN

*Attesting Officer*     *Commissioner of Patents and Trademarks*